US012569387B2

(12) United States Patent
Lee et al.

(10) Patent No.: US 12,569,387 B2
(45) Date of Patent: Mar. 10, 2026

(54) BALANCE ASSIST AND FALL PREVENTION ASSEMBLY

(71) Applicants: Rex Laine Lee, Eagle Mountain, UT (US); Rex Christian Lee, Eagle Mountain, UT (US)

(72) Inventors: Rex Laine Lee, Eagle Mountain, UT (US); Rex Christian Lee, Eagle Mountain, UT (US)

( * ) Notice: Subject to any disclaimer, the term of this patent is extended or adjusted under 35 U.S.C. 154(b) by 1266 days.

(21) Appl. No.: 17/382,531

(22) Filed: Jul. 22, 2021

(65) Prior Publication Data

US 2023/0022891 A1 Jan. 26, 2023

(51) Int. Cl.
*A61G 7/10* (2006.01)
*A61H 3/00* (2006.01)

(52) U.S. Cl.
CPC ......... *A61G 7/1042* (2013.01); *A61G 7/1034* (2013.01); *A61G 7/1051* (2013.01); *A61H 3/00* (2013.01); *A61G 2200/36* (2013.01); *A61G 2200/50* (2013.01); *A61G 2203/10* (2013.01); *A61H 3/008* (2013.01)

(58) Field of Classification Search
CPC .... A61H 1/0229; A61H 1/0292; A61H 3/008; A61H 1/0274; A61H 2003/007; A61H 2201/1652; A61H 2203/0406; A63B 21/0442; A63B 21/0552; A63B 21/4001; A63B 23/0464
See application file for complete search history.

(56) References Cited

U.S. PATENT DOCUMENTS 3,483,572 A 12/1969 Hallum
5,915,286 A * 6/1999 Figi ......................... B60R 22/48 73/865.9
6,230,088 B1 * 5/2001 Husby ............... B60R 21/01556 280/801.1
6,357,091 B1 * 3/2002 Devereaux ........ B60R 21/01546 24/303
6,474,435 B1 * 11/2002 Devereaux ........ B60R 21/01546 280/801.1
7,303,049 B1 12/2007 Greenlee
7,993,248 B1 * 8/2011 Rasmussen ............ A61H 3/008 482/69
D726,072 S 4/2015 Scott
9,682,000 B2 6/2017 Behnke
(Continued)

FOREIGN PATENT DOCUMENTS

WO WO2014116628 7/2014

*Primary Examiner* — Andrew S Lo

(57) ABSTRACT

A balance assist and fall prevention assembly for preventing falls and providing balance assistance includes a plurality of rails and a harness. The rails are mountable to a ceiling of a structure and are selectively interconnectable so that respective rails are extend along an associated route in the structure that is routinely traversed by a user. A trolley is rollably engaged to the plurality of rails. The harness can be selectively donned by the user so that the harness is removably engaged to the user. A tether is engaged to and extends between the harness and the trolley. The tether is selectively length adjustable so as to extend substantially linearly between the harness and the trolley with the user standing substantially upright and beneath the trolley. The tether thus improves balance of the user and to prevents falling of the user.

9 Claims, 5 Drawing Sheets

(56) References Cited

U.S. PATENT DOCUMENTS

| | | | | |
|---|---|---|---|---|
| 10,470,964 | B2 * | 11/2019 | Stockmaster | A61H 3/008 |
| 2004/0140890 | A1 * | 7/2004 | Hartmann | B60R 22/48<br>340/505 |
| 2006/0290130 | A1 * | 12/2006 | Hall | B60R 21/01546<br>280/801.1 |
| 2013/0116604 | A1 * | 5/2013 | Morilla | A63G 9/12<br>601/33 |
| 2016/0256346 | A1 * | 9/2016 | Stockmaster | G16H 40/63 |
| 2017/0087392 | A1 * | 3/2017 | Lambert | A61H 3/008 |
| 2017/0112705 | A1 | 4/2017 | Hornby | |
| 2017/0145732 | A1 * | 5/2017 | Marsters | E06B 5/00 |
| 2018/0021623 | A1 * | 1/2018 | Brendle | A63B 21/065<br>482/38 |
| 2018/0193217 | A1 * | 7/2018 | Von Zitzewitz | A61H 3/008 |
| 2018/0229070 | A1 * | 8/2018 | Mcbride | A63B 21/4001 |
| 2019/0022439 | A1 | 1/2019 | Dillon | |
| 2019/0167503 | A1 * | 6/2019 | Van Gelder | A61H 1/0292 |
| 2019/0256041 | A1 * | 8/2019 | Tinoco | G01R 33/072 |
| 2020/0230005 | A1 * | 7/2020 | Hidler | A61G 7/1042 |
| 2021/0137768 | A1 * | 5/2021 | Buswell | A61H 3/04 |
| 2022/0234540 | A1 * | 7/2022 | Barnes | B60N 2/2812 |
| 2022/0395418 | A1 * | 12/2022 | Mitschke | A61H 3/008 |
| 2022/0396238 | A1 * | 12/2022 | Obadia | B64D 11/062 |

* cited by examiner

BALANCE ASSIST AND FALL PREVENTION ASSEMBLY

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to fall prevention assemblies and more particularly pertains to a new fall prevention assembly for preventing falls and providing balance assistance. The present invention discloses a fall prevention assembly comprising a network of rails extending along routes in a structure routinely traversed by a user. A harness worn by user is tethered to a trolley that is engaged to the rails. The tether provides balance assistance and prevents the user from falling.

(2) Description of Related Art Including Information Disclosed Under 37 CFR 1.97 and 1.98

The prior art relates to fall prevention assemblies. The prior art comprises rail and trolley systems designed to support some or all of the weight of a user, such as in gait training, transferring patients, and transferring disabled individuals. What is lacking in the prior art is a fall prevention assembly comprising a network of rails extending along routes in a structure routinely traversed by a user and including harness worn by user that includes sensors to detect improper attachment of the harness to the user. The harness is tethered to a trolley that is engaged to the rails. The tether provides balance assistance and prevents the user from falling.

BRIEF SUMMARY OF THE INVENTION

An embodiment of the disclosure meets the needs presented above by generally comprising a plurality of rails and a harness. The rails are configured to be mountable to a ceiling of a structure and are selectively interconnectable so that respective rails are configurable to extend along an associated route in the structure that is routinely traversed by a user. A trolley is rollably engaged to the plurality of rails. The harness is configured to be selectively donned by the user so that the harness is removably engaged to the user. A tether is engaged to and extends between the harness and the trolley. The tether is selectively length adjustable so as to extend substantially linearly between the harness and the trolley with the user standing substantially upright and beneath the trolley. The tether thus is configured to improve balance of the user and to prevent falling of the user.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
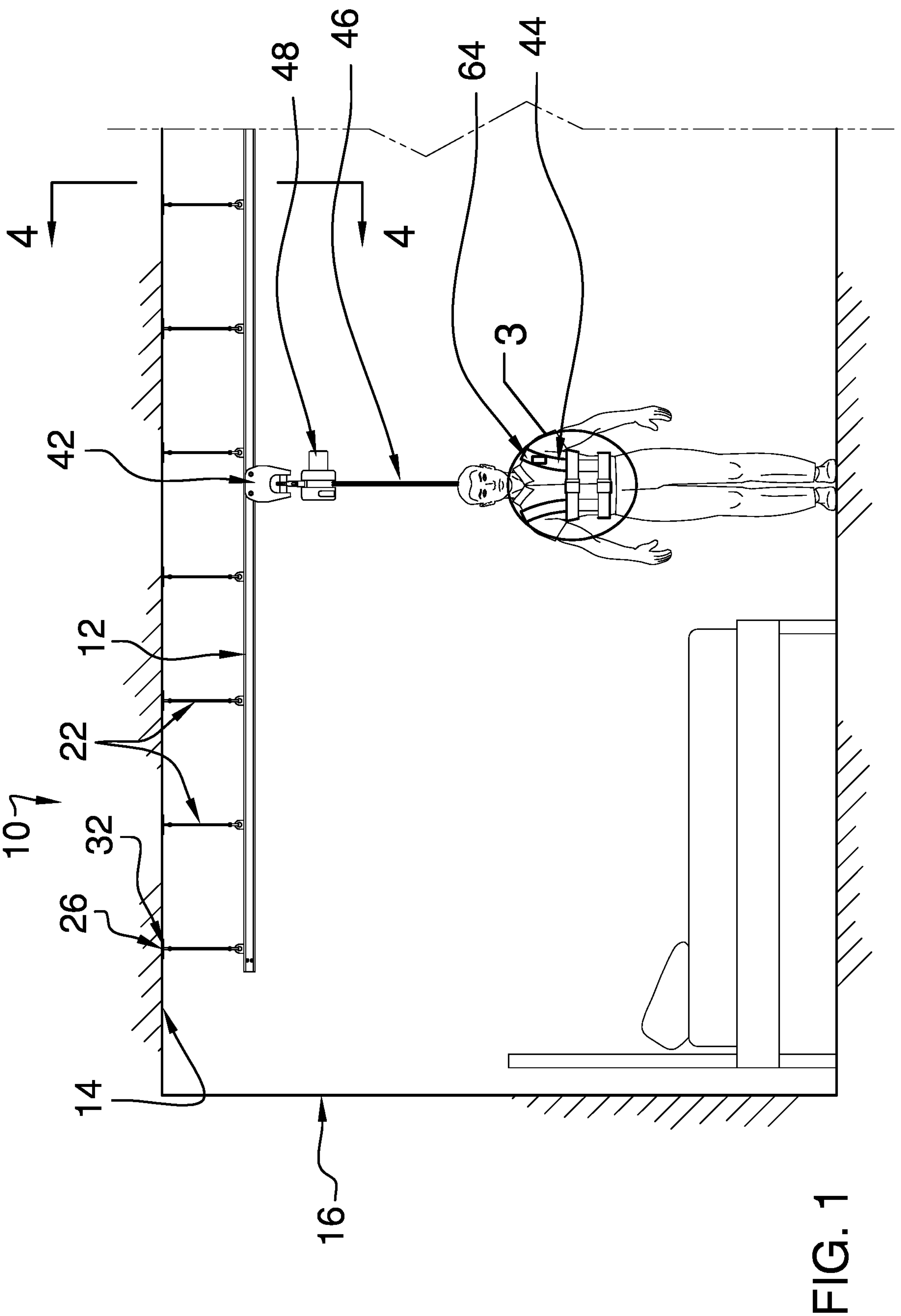
FIG. 1 is an in-use view of a balance assist and fall prevention assembly according to an embodiment of the disclosure.

With reference now to the drawings, and in particular to FIGS. 1 through 5 thereof, a new fall prevention assembly embodying the principles and concepts of an embodiment of the disclosure and generally designated by the reference numeral 10 will be described.

Figure 2:
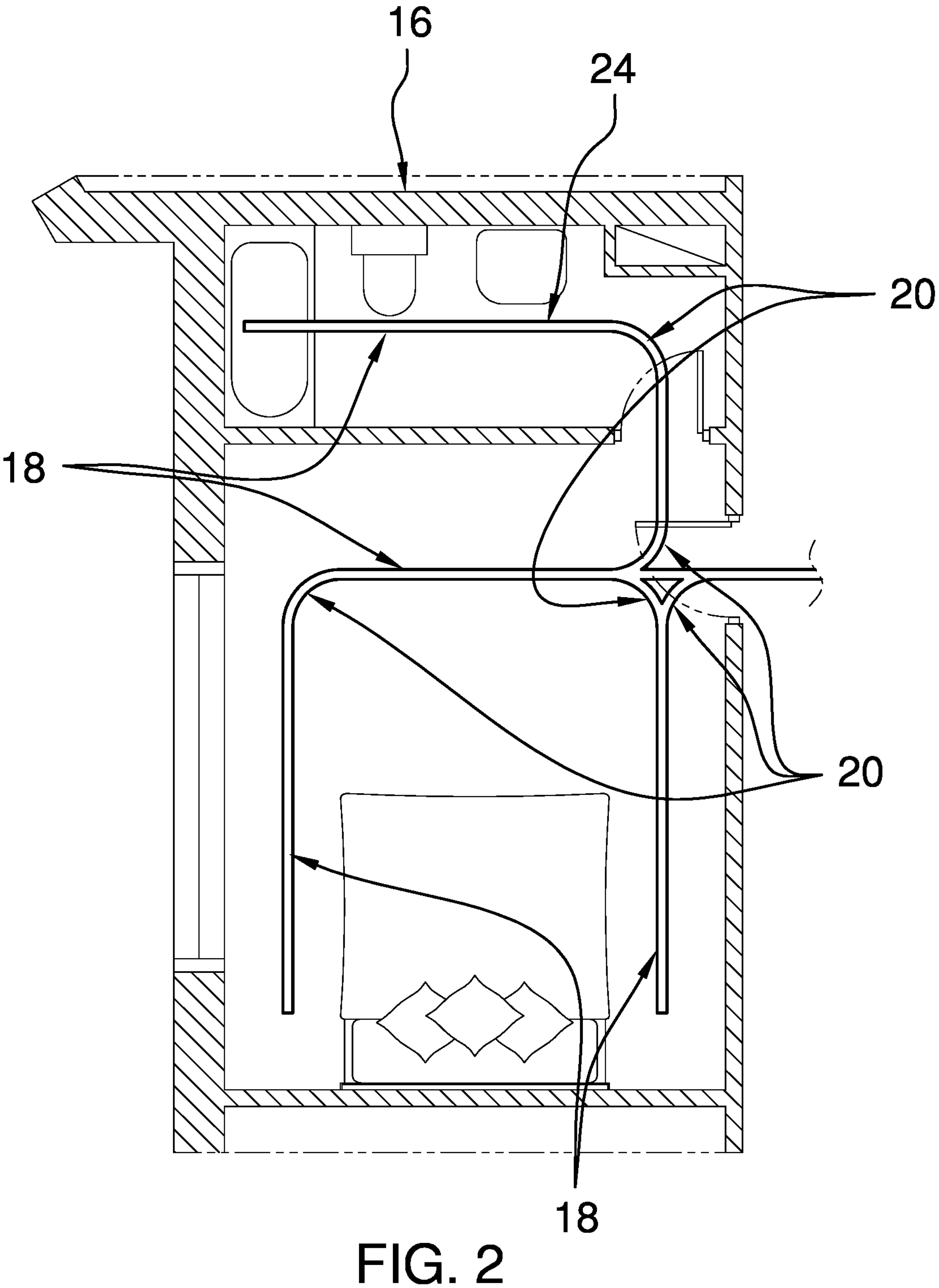
FIG. 2 is a detail view of an embodiment of the disclosure.

As best illustrated in FIGS. 1 through 5, the balance assist and fall prevention assembly 10 generally comprises a plurality of rails 12 and a harness 44. The rails 12 are configured to be mountable to a ceiling 14 of a structure 16, such as a residence, and are selectively interconnectable so that respective rails 12 are configurable to extend along an associated route in the structure 16 that is routinely traversed by a user. The plurality of rails 12 comprises a set of linear segments 18 and a set of curved segments 20. Each curved segment 20 is engaged to and extends between two adjacently positioned linear segments 18, as shown in FIG. 2, so that one of the two adjacently positioned linear segments 18 is transverse to the other. The curved segment 20 and the adjacently positioned linear segments 18 are configured to follow a directional change in an associated route in the structure 16.

A plurality of rods 22 is engaged to and extends from an upper face 24 of the plurality of rails 12. Each rod 22 is configured to engage a respective structural element 26 of the ceiling 14, such as a joist, so that the plurality of rods 22 engages the plurality of rails 12 to the ceiling 14.

Each of a plurality of first fasteners 28 is engaged to a first end 30 of a respective rod 22. A second end 32 of the respective rod 22 is threaded and thus is screwable into a hole positioned in a respective structural element 26 to engage the respective rod 22 to the respective structural element 26. A plurality of second fasteners 34 is engaged to the upper face 24 of the plurality of rails 12. Each second fastener 34 is engaged to a respective first fastener 28 so that a respective rod 22 is engaged to the second fastener 34.

Figure 4:
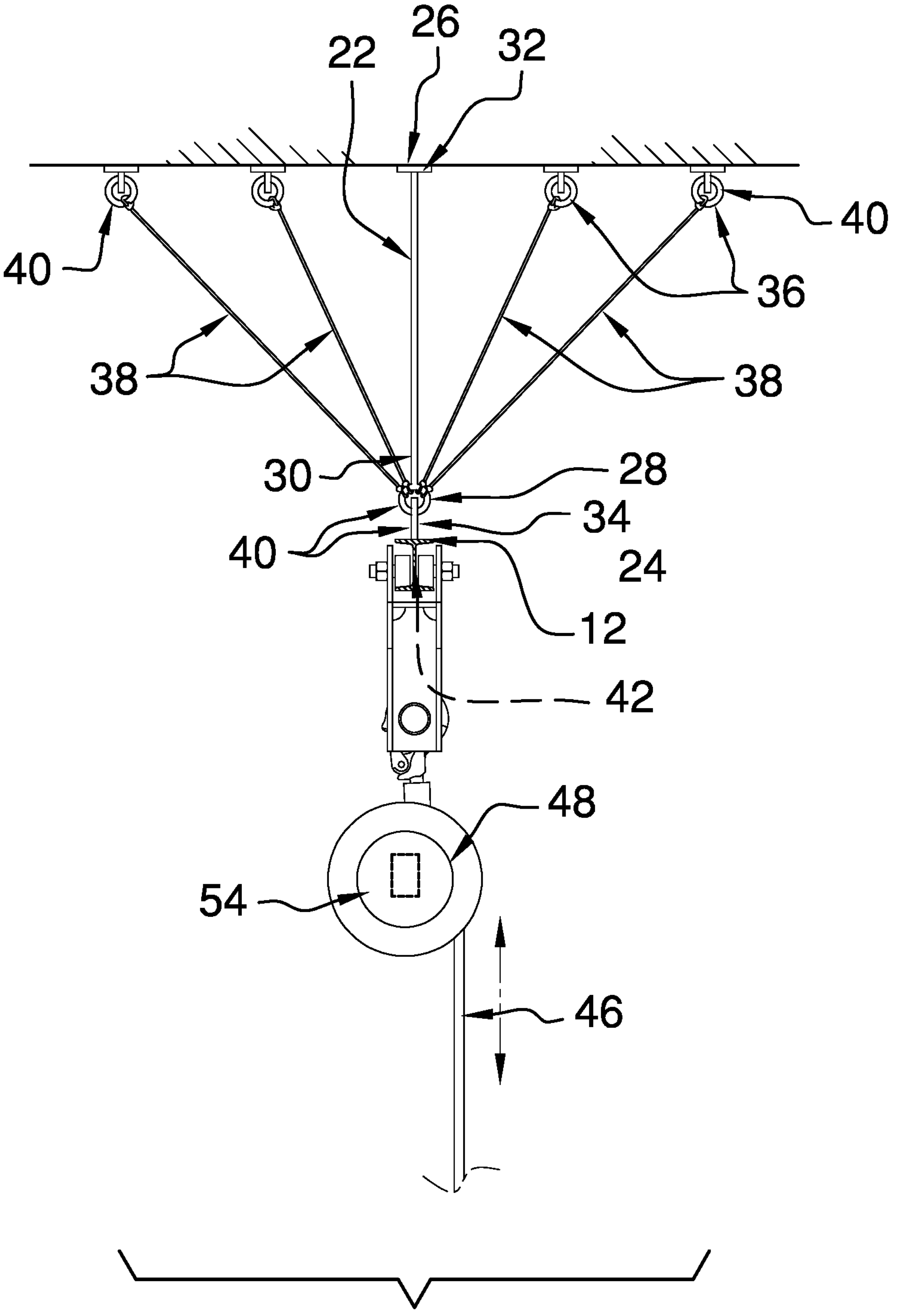
FIG. 4 is a side view of an embodiment of the disclosure.

Each of a plurality of third fasteners 36 is configured to be mountable to a respective structural element 26 of the ceiling 14 so that each rod 22 is bracketed by a set of third fasteners 36. The set of third fasteners 36 may comprise four third fasteners 36, as shown in FIG. 4. Each of a plurality of cables 38 is engaged to and extends between a respective first fastener 28 and a respective third fastener 36 so that each third fastener 36 of an associated set of third fasteners 36 is engaged to the respective first fastener 28 by a respective cable 38. Each first fastener 28, each second fastener 34, and each third fastener 36 may comprise a ring 40, or other fastening means, such as, but not limited to, hooks, eyebolts, and the like.

Figure 5:
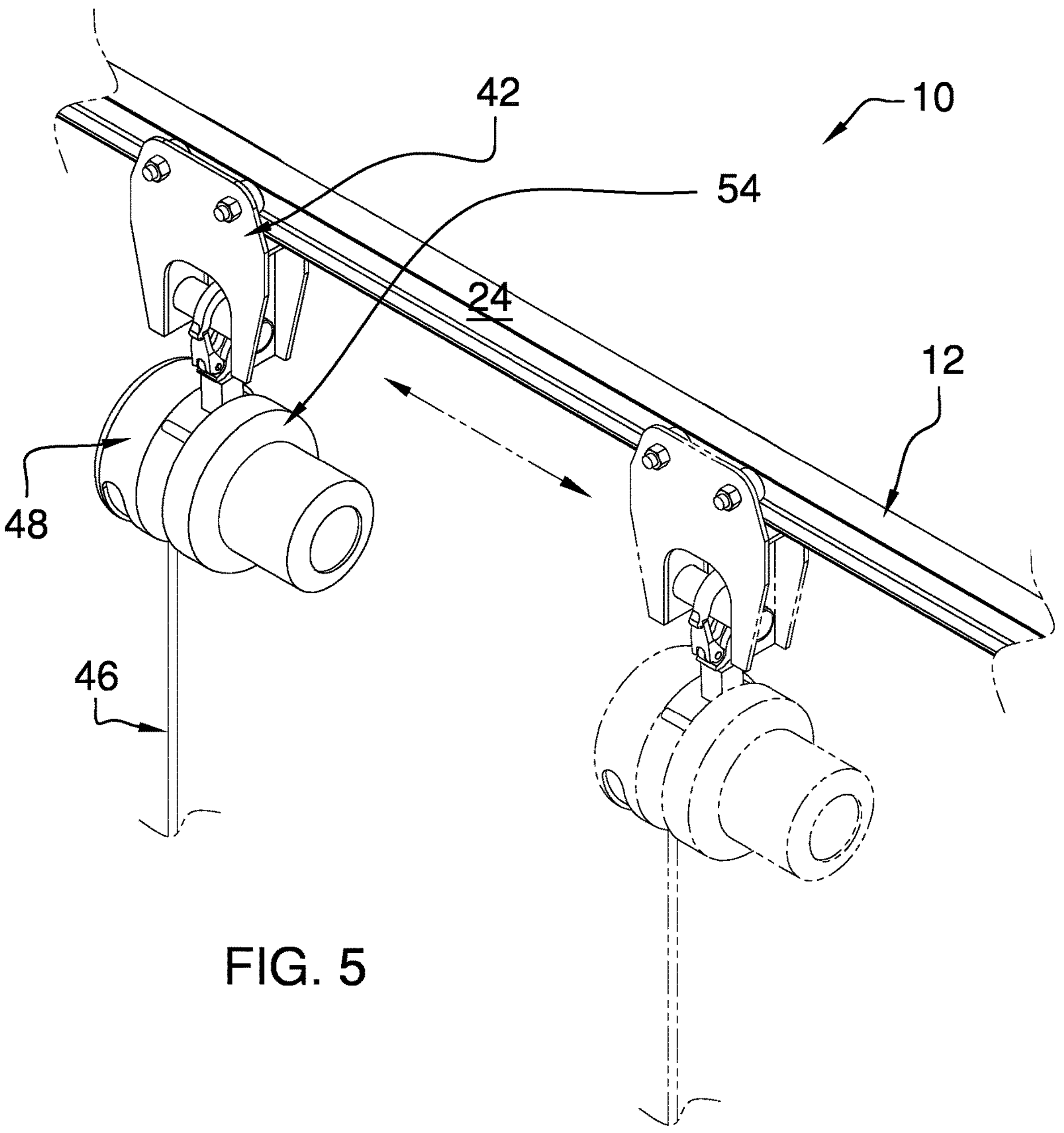
FIG. 5 is a detail view of an embodiment of the disclosure.

A trolley 42 is rollably engaged to the plurality of rails 12. The trolley 42 may be four wheeled, as shown in FIG. 5, or of other configurations known to those skilled in the art of trolleys. The harness 44 is configured to be selectively donned by the user so that the harness 44 is removably engaged to the user. A tether 46 is engaged to and extends between the harness 44 and the trolley 42. The tether 46 is selectively length adjustable so as to extend substantially linearly between the harness 44 and the trolley 42 with the user standing substantially upright and beneath the trolley 42. The tether 46 thus is configured to improve balance of the user and to prevent falling of the user.

A length adjustment module 48 is engaged to the trolley 42 and is operationally engaged to the tether 46. The length adjustment module 48 is positioned to selectively adjust a length 50 of the tether 46. A receiver 52 is operationally engaged to the length adjustment module 48. As shown in FIG. 5, the length adjustment module 48 may comprise a winch 54, although the present invention anticipates the length adjustment module 48 comprising other length adjusting means, such as, but not limited to, a spring loaded spool with a brake. With the length adjustment module 48 comprising a winch 54, lift assistance also is available to the user as needed. For example, the user could actuate the winch 54 for assistance in rising from a toilet or chair.

Figure 3:
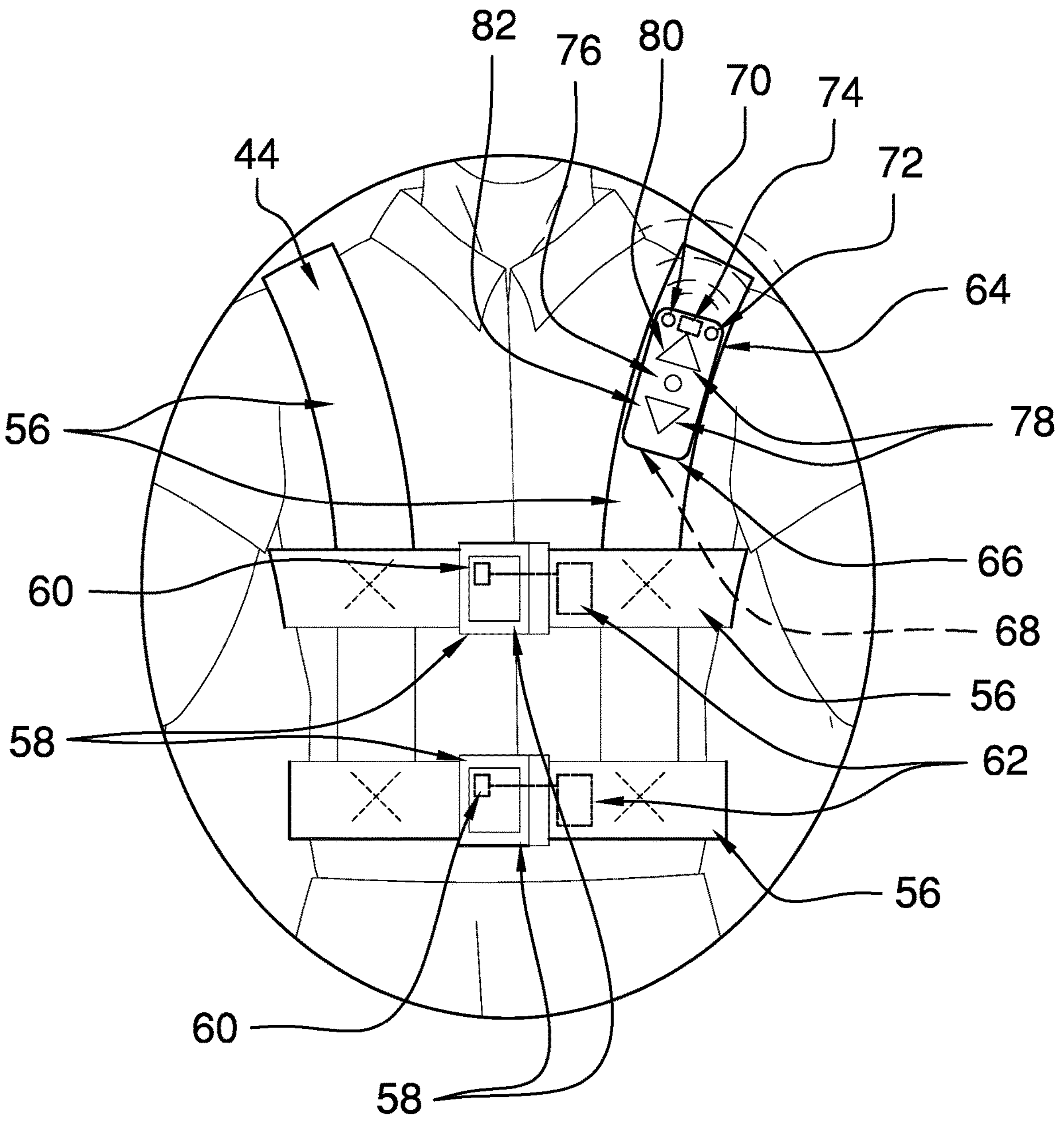
FIG. 3 is a detail view of an embodiment of the disclosure.

The harness 44 comprises a plurality of straps 56 and a plurality of buckles 58. The buckles 58 are engaged singly to the straps 56 with each buckle 58 positioned to fixedly position an associated strap 56 in a looped configuration around the user. As shown in FIG. 3, two straps 56 extend over shoulders of the user, and two straps 56 with buckles 58 extend around an abdomen of the user. As will be apparent to those skilled in the art of harnesses, a number of other configuration of the harness 44 are possible and are anticipated by the present invention, including use of other fastening means in place of the buckles 58.

Each of a plurality of sensors 60 is engaged to a respective buckle 58. The sensor 60 is configured to detect proper buckling of the respective buckle, which may be accomplished by positional sensing, proximity sensing, contact sensing, and the like. Each of a plurality of transmitters 62 is operationally engaged to a respective sensor 60.

A controller 64 is engaged to the harness 44. The controller 64 comprises a housing 66, which defines an interior space 68. A microprocessor 70, a battery 72, and a transceiver 74 are engaged to the housing 66 and are positioned in the interior space 68. A speaker 76 and a switch 78 are engaged to the housing 66. The microprocessor 70 is operationally engaged to the battery 72, the transceiver 74, the speaker 76, and the switch 78 so that the controller 64 is positioned for wireless communication with the plurality of sensors 60 and the length adjustment module 48. The controller 64 also is positioned to broadcast an audible alert, via the speaker 76, upon receipt of a signal from a respective transmitter 62 corresponding to improper buckling of an associated buckle 58. The switch 78 is configured to be switched to signal the microprocessor 70 to actuate the transceiver 74 to selectively communicate a raise command or a lower command to the length adjustment module 48 to shorten or to lengthen the tether 46, respectively. The switch 78 may comprise an Up button 80 and a Down button 82, as shown in FIG. 3, other switching means, such as, but not limited to, toggles, dials, and the like.

In use, the plurality of rails 12 is affixed to the ceiling 14 so as to track routes in the structure 16 commonly traversed by the user, such as routes linking a bedroom, a bathroom, a kitchen, and the like. With the trolley 42 engaged to the plurality of rails 12 and the user donning a harness 44 engaged to the winch 54 by the tether 46, the user can move about the structure 16 without fear of falling and with improved balance provided by the tether 46.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

We claim:

1. A balance assist and fall prevention assembly comprising:

a plurality of rails configured to be mountable to a ceiling of a structure, the rails being selectively interconnectable, such that respective rails are configurable to extend along an associated route in the structure routinely traversed by a user;

a trolley rollably engaged to the plurality of rails;

a harness configured for selective donning by the user, such that the harness is removably engaged to the user, the harness comprising a plurality of straps, and a plurality of buckles engaged singly to the straps, such that each buckle is positioned for fixedly positioning an associated strap in a looped configuration around the user;

a plurality of sensors, each of the sensors being engaged to a respective buckle, each of the sensors being configured for detecting proper buckling of the respective buckle;

a tether engaged to and extending between the harness and the trolley, the tether being selectively length adjustable, such that the tether extends substantially linearly between the harness and the trolley with the user standing substantially upright and beneath the trolley, wherein the tether is configured for improving balance of the user and for preventing falling of the user;

a plurality of rods engaged to and extending from an upper face of the plurality of rails, each rod being configured for engaging a respective structural element of the ceiling of the structure, such that the plurality of rods engages the plurality of rails to the ceiling;

a plurality of first fasteners, each first fastener being engaged to a first end of a respective rod, a second end of the respective rod being threaded, such that the second end is screwable into a hole positioned in a respective structural element for engaging the respective rod to the respective structural element;

a plurality of second fasteners engaged to the upper face of the plurality of rails, each second fastener being engaged to a respective first fastener, such that a respective rod is engaged to the second fastener;

a plurality of third fasteners, each third fastener being configured to be mountable to a respective structural element of the ceiling of the structure, such that each rod is bracketed by a set of third fasteners; and a plurality of cables, each cable being engaged to and extending between a respective first fastener and a respective third fastener, such that each third fastener of an associated set of third fasteners is engaged to the respective first fastener by a respective cable.

2. The balance assist and fall prevention assembly of claim 1, wherein the plurality of rails comprises:

a set of linear segments; and a set of curved segments, each curved segment being engaged to and extending between two adjacently positioned linear segments, such that one of the two adjacently positioned linear segments is transverse to the other, wherein the curved segment and the adjacently positioned linear segments are configured for following a directional change in an associated route in the structure.

3. The balance assist and fall prevention assembly of claim 1, wherein the set of third fasteners comprises four third fasteners.

4. The balance assist and fall prevention assembly of claim 1, wherein each first fastener, each second fastener, and each third fastener comprises a ring.

5. The balance assist and fall prevention assembly of claim 1, further including a length adjustment module engaged to the trolley and being operationally engaged to the tether, such that the length adjustment module is positioned for selectively adjusting a length of the tether.

6. A balance assist and fall prevention assembly comprising:

a plurality of rails configured to be mountable to a ceiling of a structure, the rails being selectively interconnectable, such that respective rails are configurable to extend along an associated route in the structure routinely traversed by a user;

a trolley rollably engaged to the plurality of rails;

a harness configured for selective donning by the user, such that the harness is removably engaged to the user, the harness comprising a plurality of straps, and a plurality of buckles engaged singly to the straps, such that each buckle is positioned for fixedly positioning an associated strap in a looped configuration around the user;

a plurality of sensors, each of the sensors being engaged to a respective buckle, each of the sensors being configured for detecting proper buckling of the respective buckle;

a tether engaged to and extending between the harness and the trolley, the tether being selectively length adjustable, such that the tether extends substantially linearly between the harness and the trolley with the user standing substantially upright and beneath the trolley, wherein the tether is configured for improving balance of the user and for preventing falling of the user;

a length adjustment module engaged to the trolley and being operationally engaged to the tether, such that the length adjustment module is positioned for selectively adjusting a length of the tether;

a plurality of transmitters, each transmitter being operationally engaged to a respective sensor;

a receiver operationally engaged to the length adjustment module; and a controller engaged to the harness, the controller comprising:

a housing defining an interior space, a battery engaged to the housing and positioned in the interior space, a microprocessor engaged to the housing and positioned in the interior space, the microprocessor being operationally engaged to the battery, a transceiver operationally engaged to the microprocessor, such that the controller is positioned for wireless communication with the plurality of sensors and the length adjustment module, and a speaker engaged to the housing and being operationally engaged to the microprocessor, such that the controller is positioned for broadcasting an audible alert upon receipt of a signal from a respective transmitter corresponding to improper buckling of an associated buckle, and a switch engaged to the housing and being operationally engaged to the microprocessor, wherein the switch is configured for switching for signaling the microprocessor for actuating the transceiver for selectively communicating a raise command or a lower command to the length adjustment module for shortening or lengthening the tether, respectively.

7. The balance assist and fall prevention assembly of claim 6, wherein the length adjustment module comprising a winch.

8. The balance assist and fall prevention assembly of claim 6, wherein the switch comprising an Up button and a Down button.

9. A balance assist and fall prevention assembly comprising:

a plurality of rails configured to be mountable to a ceiling of a structure, the rails being selectively interconnectable, such that respective rails are configurable to extend along an associated route in the structure routinely traversed by a user, the plurality of rails comprising:

a set of linear segments, and a set of curved segments, each curved segment being engaged to and extending between two adjacently positioned linear segments, such that one of the two adjacently positioned linear segments is transverse to the other, wherein the curved segment and the adjacently positioned linear segments are configured for following a directional change in an associated route in the structure;

a plurality of rods engaged to and extending from an upper face of the plurality of rails, each rod being configured for engaging a respective structural element of the ceiling of the structure, such that the plurality of rods engages the plurality of rails to the ceiling;

a plurality of first fasteners, each first fastener being engaged to a first end of a respective rod, a second end of the respective rod being threaded, such that the second end is screwable into a hole positioned in a respective structural element for engaging the respective rod to the respective structural element;

a plurality of second fasteners engaged to the upper face of the plurality of rails, each second fastener being engaged to a respective first fastener, such that a respective rod is engaged to the second fastener;

a plurality of third fasteners, each third fastener being configured to be mountable to a respective structural element of the ceiling of the structure, such that each rod is bracketed by a set of third fasteners, the set of third fasteners comprising four third fasteners;

a plurality of cables, each cable being engaged to and extending between a respective first fastener and a respective third fastener, such that each third fastener of an associated set of third fasteners is engaged to the respective first fastener by a respective cable, each first fastener, each second fastener, and each third fastener comprising a ring;

a trolley rollably engaged to the plurality of rails;

a harness configured for selective donning by the user, such that the harness is removably engaged to the user, the harness comprising:

a plurality of straps, and a plurality of buckles engaged singly to the straps, such that each buckle is positioned for fixedly positioning an associated strap in a looped configuration around the user;

a plurality of sensors, each sensor being engaged to a respective buckle, wherein the sensor is configured for detecting proper buckling of the respective buckle;

a plurality of transmitters, each transmitter being operationally engaged to a respective sensor;

a tether engaged to and extending between the harness and the trolley, the tether being selectively length adjustable, such that the tether extends substantially linearly between the harness and the trolley with the user standing substantially upright and beneath the trolley, wherein the tether is configured for improving balance of the user and for preventing falling of the user;

a length adjustment module engaged to the trolley and being operationally engaged to the tether, such that the length adjustment module is positioned for selectively adjusting a length of the tether, the length adjustment module comprising a winch;

a receiver operationally engaged to the length adjustment module; and a controller engaged to the harness, the controller comprising:

a housing defining an interior space, a battery engaged to the housing and positioned in the interior space, a microprocessor engaged to the housing and positioned in the interior space, the microprocessor being operationally engaged to the battery, a transceiver operationally engaged to the microprocessor, such that the controller is positioned for wireless communication with the plurality of sensors and the length adjustment module, and a speaker engaged to the housing and being operationally engaged to the microprocessor, such that the controller is positioned for broadcasting an audible alert upon receipt of a signal from a respective transmitter corresponding to improper buckling of an associated buckle, and a switch engaged to the housing and being operationally engaged to the microprocessor, wherein the switch is configured for switching for signaling the microprocessor for actuating the transceiver for selectively communicating a raise command or a lower command to the length adjustment module for shortening or lengthening the tether, respectively, the switch comprising an Up button and a Down button.

* * * * *